(12) United States Patent
Ohnari

(10) Patent No.: US 7,472,893 B2
(45) Date of Patent: Jan. 6, 2009

(54) SWIRLING TYPE MICRO-BUBBLE GENERATING SYSTEM

(76) Inventor: Hirofumi Ohnari, 15-20, Jyogaoka, 3-chome, Tokuyama-shi, Yamaguchi 745-0807 (JP)

(*) Notice: Subject to any disclaimer, the term of this patent is extended or adjusted under 35 U.S.C. 154(b) by 0 days.

(21) Appl. No.: 11/878,526

(22) Filed: Jul. 25, 2007

(65) Prior Publication Data

US 2007/0267763 A1   Nov. 22, 2007

Related U.S. Application Data

(62) Division of application No. 09/743,531, filed as application No. PCT/JP00/03089 on May 15, 2000, now Pat. No. 7,261,283.

(30) Foreign Application Priority Data

May 15, 1999   (JP)   ................... 11-171491

(51) Int. Cl.
*B01F 3/04* (2006.01)
(52) U.S. Cl. .................... 261/79.2; 261/108
(58) Field of Classification Search ............ 261/79.1, 261/79.2, 108, 109, 110, DIG. 75
See application file for complete search history.

(56) References Cited

U.S. PATENT DOCUMENTS

| | | | |
|---|---|---|---|
| 2,353,912 A | 7/1944 | Lindsey | 261/79.2 |
| 2,653,801 A | 9/1953 | Fontein et al. | 261/79.2 |
| 3,238,021 A | 3/1966 | Webber et al. | 261/79.2 |

(Continued)

FOREIGN PATENT DOCUMENTS

JP   48-6211   2/1973

(Continued)

OTHER PUBLICATIONS

Microfilm of the specification and drawings annexed to the request of Japanese Utility Model Application No. 101854/1974 (Laid-open No. 28865/1976) (Toyo Gomu Kagaku Kogyo K. K.), Mar. 2, 1976 (listed in International Search Report having mailing date Aug. 15, 2000).

(Continued)

*Primary Examiner*—Scott Bushey
(74) *Attorney, Agent, or Firm*—Kratz, Quintos & Hanson, LLP.

(57) ABSTRACT

The swirling type micro-bubble generating system according to the present invention possesses a container main unit having a cylindrical space with bottom or a frusto conically shaped space, a liquid inlet provided in tangential direction on a part of circumferential surface of inner wall of the space, a gas introducing hole provided on the bottom of the cylindrical space or opening of the frusto conically shaped space, and a swirling gas-liquid mixture outlet arranged at the top of the cylindrical space or opening of the frusto conically shaped space. According to this system, it is possible to readily generate micro-bubbles in industrial scale, and the system is relatively small in size and has simple structure and can be easily manufactured. The system can be used in the applications such as purification of water quality in ponds, lakes, marshes, man-made lakes, rivers, etc., for processing of polluted water using microorganisms, culture of fishes and other aquatic animals, and increase of oxygen and dissolved oxygen in culture solution in hydroponics culture farm and improvement of production yield.

1 Claim, 6 Drawing Sheets

U.S. PATENT DOCUMENTS

| | | | |
|---|---|---|---|
| 3,890,655 A | 6/1975 | Mathis | 4/541.6 |
| 3,946,993 A | 3/1976 | Morlin | 261/79.2 |
| 4,292,259 A | 9/1981 | Roth et al. | 261/123 |
| 4,374,813 A * | 2/1983 | Chen et al. | 423/243.08 |
| 4,389,312 A | 6/1983 | Beard | 261/DIG. 75 |
| 4,726,686 A | 2/1988 | Wolf et al. | 261/79.2 |
| 4,810,268 A * | 3/1989 | Chambers et al. | 95/199 |
| 4,834,343 A | 5/1989 | Boyes | 261/DIG. 75 |
| 5,004,484 A | 4/1991 | Stirling et al. | 261/DIG. 75 |
| 5,059,357 A | 10/1991 | Wolf et al. | 261/79.2 |
| 5,350,543 A | 9/1994 | Spradley | 261/DIG. 75 |
| 5,441,482 A | 8/1995 | Clague et al. | 604/35 |
| 6,382,601 B1 | 5/2002 | Ohnari | 261/79.2 |

FOREIGN PATENT DOCUMENTS

| | | |
|---|---|---|
| JP | 5031471 | 3/1975 |
| JP | 101854/1974 | 3/1976 |
| JP | 54-41247 | 12/1979 |
| JP | 117285/1982 | 2/1984 |

OTHER PUBLICATIONS

Microfilm of the specification and drawings annexed to the request of Japanese Utility Model Application No. 117285/1982 (Laid-open No. 24199/1984) (Kabushiki Kaisha Fuji Denki Sogo Kenkyusho), Feb. 15, 1984 (listed in International Search Report having mailing date Aug. 15, 2000).

* cited by examiner

SWIRLING TYPE MICRO-BUBBLE GENERATING SYSTEM

This is a divisional of application Ser. No. 09/743,531, filed Jun. 5, 2001 now U.S. Pat. No. 7,261,283, issued Aug. 7, 2007, which is a U.S. National Phase of PCT/JP00/03089, filed May 15, 2000, and claims priority under 35 U.S.C. §119 based on Japanese Application 11-171491, filed May 15, 1999, the entire disclosures of which related applications are hereby incorporated herein by reference in their entireties.

FIELD OF THE INVENTION

The present invention relates to a micro-bubble generating system for efficiently dissolving gas such as the air, oxygen gas, etc. into liquid such as city water, river water, etc., for purifying polluted water and for effectively utilizing the water for reconditioning and renewal of water environment.

BACKGROUND ART

In conventional type aeration systems, e.g. in most of aeration systems using micro-bubble generating system installed for culture and growth of aquatic animals, air bubbles are generated by injecting the air under pressure into water through fine pores of tubular or planar micro-bubble generating system installed in the tank, or air bubbles are generated by introducing the air into water flow with shearing force or by vaporizing the air dissolved in water by rapidly reducing pressure of the pressurized water.

In the aeration process using the micro-bubble generating system with the above functions, operation is basically controlled by adjusting the air supply quantity or the number of the micro-bubble generating systems to be installed, while it is necessary to efficiently dissolve gas such as air, carbon dioxide, etc. into water and further to promote circulation of the water.

However, in the, aeration system using the conventional type micro-bubble generating system, e.g. diffusion system based on injection, even when fine pores are provided, when air bubbles are injected under pressure through pores, volume of each of the air bubbles is expanded, and diameter of each air bubble is increased to several millimeters due to surface tension of the air bubbles during injection. Thus, it is difficult to generate air bubbles of smaller diameter. Also, there are problems such as clogging of the pores or increase of power consumption caused by the operation for long time.

In the system to generate the air bubbles by introducing the air into water flow with shearing force using vanes and air bubble jet stream, it is necessary to have higher number of revolutions to generate cavitation. Also, there are problems of power consumption increase and the problem of corrosion of vanes or vibration caused by generation of cavitation. Further, there are problems in that only a small amount of micro-bubbles can be generated.

In the system where gas-liquid two-phase flow collides with the moving vane or projection, fishes or small aquatic animals in natural lakes or culture tanks may be injured, and this causes trouble in the development and maintenance of the environmental condition necessary for the growth of fishes and other aquatic animals.

Further, in the pressurizing system, the system must be designed in larger size and requires higher cost, and operation cost is also high.

In none of the prior art in this field as described above, it has been possible to generate micro-bubbles with diameter of not more than 20 μm in industrial scale.

DISCLOSURE OF THE INVENTION

After fervent study efforts, the present inventors have successfully developed the present invention, by which it is possible to generate micro-bubbles with diameter of not more than 20 μm in industrial scale.

Specifically, the present invention provides:

(1) a swirling type micro-bubble generating system, comprising a container main unit having a cylindrical space with bottom, a pressure liquid inlet provided in tangential direction on a part of circumferential surface on inner wall of the space, a gas introducing hole opened on the bottom of the cylindrical space, and a swirling gas-liquid mixture outlet arranged at the top of the cylindrical space;

(2) a swirling type micro-bubble generating system, comprising a container main unit having a megaphone-shaped space with inlet closed, a pressure liquid inlet provided in tangential direction on a part of circumferential surface on inner wall of the space, a gas introducing hole opened on the inlet of the megaphone-shaped space, and a swirling gas-liquid mixture outlet arranged at the top of the megaphone-shaped space.

(3) a swirling type micro-bubble generating system according to (1) or (2) above, wherein a plurality of pressure liquid inlets are provided with spacings in tangential direction on a part of circumferential surface on inner wall of the space;

(4) a swirling type micro-bubble generating system according to one of (1) to (3) above, wherein the pressure liquid inlet is provided on a part of circumferential surface of inner wall near the top of the space;

(5) a swirling type micro-bubble generating system according to one of (1) to (4) above, wherein the pressure liquid inlet is provided on a part of circumferential surface of inner wall near a point halfway down of the space; and (6) a swirling type micro-bubble generating system according to one of (1) to (5) above, wherein a baffle plate is arranged immediately before the swirling gas-liquid mixture outlet opened on the top of the cylindrical space.

(7) a swirling type micro-bubble generating system, comprising a partition plate for blocking said outlet, leaving only a partial opening, said partition plate being attached immediately before the swirling gas-liquid mixture outlet opened at the top of the cylindrical space.

(8) a method for swirling type micro-bubble generation, using a micro-bubble generating system, which comprises a container main unit having a cylindrical space with bottom, a pressure liquid introducing port opened in tangential direction on a part of circumferential surface of inner wall of said space, a gas introducing hole opened at the bottom of said cylindrical space, and a swirling gas-liquid discharge outlet opened at the top of said cylindrical space, whereby said method comprises a first step of forming a swirling gas cavity swirling and flowing while being extended and narrowed down in said cylindrical space, and a second step of generating micro-bubbles when the swirling gas cavity is forcibly cut off and smashed due to the difference of swirling velocity between the portions of the swirling gas cavity.

(9) a method for swirling type micro-bubble generation, using a micro-bubble generating system, which. comprises a container main unit having a cylindrical space with bottom, a pressure liquid inlet opened in tangential direction on a part of circumferential surface of inner wall of said space, a gas introducing hole opened at the bottom of said cylindrical space, and a swirling gas-liquid mixture outlet opened at the top of said cylindrical space, whereby said method comprises:

a first step of forming a swirling gas cavity for swirling and guiding while extending and narrowing down self-sucking gas in said cylindrical space;

a second step of generating micro-bubbles when the swirling gas cavity is forcibly cut off and smashed due to the difference of swirling velocity in said swirling gas cavity; and a third step of continuously and steadily cutting off and smashing said swirling gas cavity in said cylindrical space, whereby the fluid passing through the rotating cut-off portion is rapidly expanded in conical shape while rotating (where a fluid not containing micro-bubbles flowing from outside is filled in the rotating fluid expanding in conical shape), said rotating fluid expanding in conical shape being stably formed, and expanded angle of the conical shape is large (about 90°), and the difference of rotating velocity in the rotating cut-off portion and the smashed portion in the second step is relatively increased.

(Legend of the Symbols)

| | |
|---|---|
| 1 | Cylindrical space |
| 2 | Pressure liquid inlet |
| 3 | Bottom of cylindrical space |
| 4 | Gas introducing hole |
| 5 | Swirling gas-liquid mixture outlet |
| 6 | Gas flowrate regulating valve |
| 7 | Pressure liquid inlet pipe |
| 8 | Gas inlet pipe |
| 9 | Baffle plate |
| 9a | Partition plate |
| 10 | Megaphone-shaped space |
| 20 | Pressure liquid inlet |
| 30 | Inlet of megaphone-shaped space |
| 40 | Gas introducing hole |
| 50 | Swirling gas-liquid mixture outlet |
| $d_1$ | Bore diameter of swirling gas-liquid mixture outlet 5 |
| $d_2$ | Bore diameter of gas introducing hole 4 |
| $d_3$ | Bore diameter of pressure liquid introducing hole 2 |
| L | Distance between swirling gas-liquid mixture outlet 5 and bottom of cylindrical space 3 |
| Mb | Micro-bubbles |
| S | small spacing |

BEST MODE FOR CARRYING OUT THE INVENTION

Figure 1:
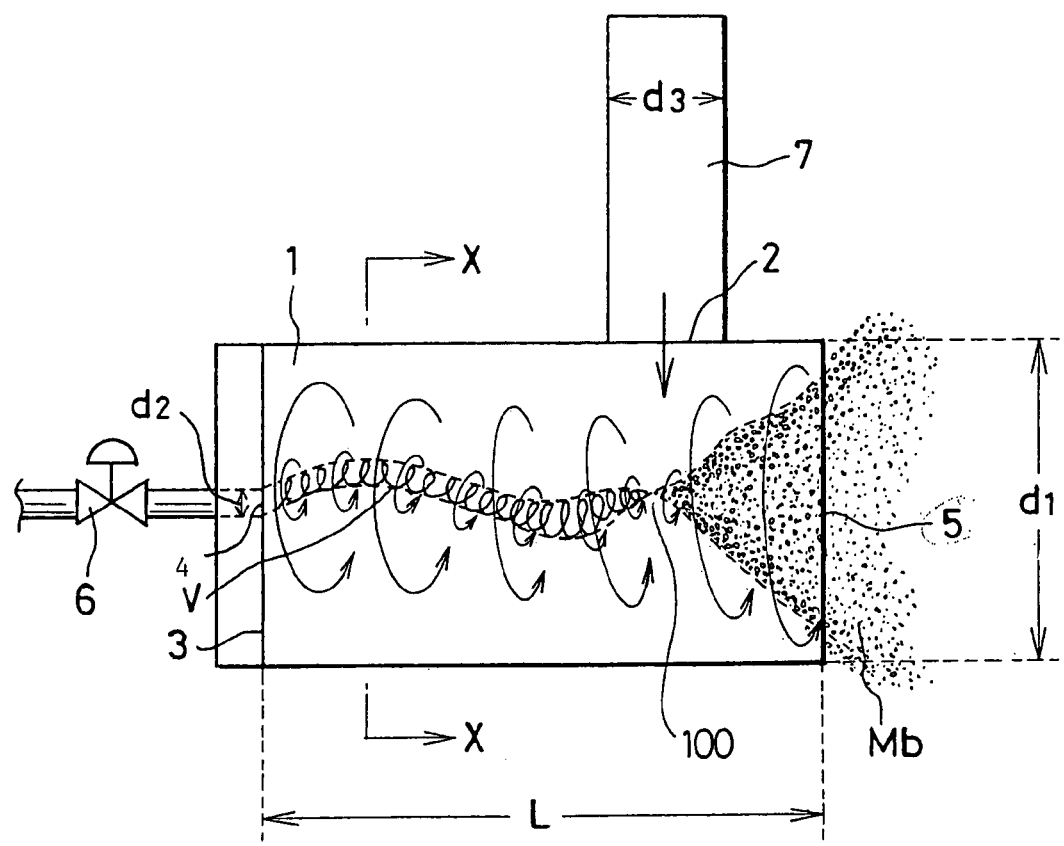
FIG. 1 is a front view of a swirling type micro-bubble generating system of an embodiment of the present invention.
Figure 1:
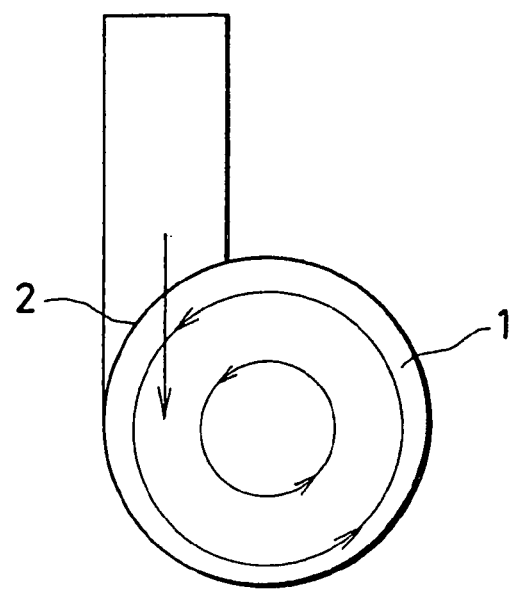

As shown in the drawing to explain the principle of the present invention in FIG. 1, a micro-bubble generating system comprises a cylindrical space with bottom 1 formed in a container of the system, a pressure liquid inlet 2 provided in tangential direction on a part of circumferential surface of inner wall of the space, a gas introducing hole 4 arranged at the center of a bottom 3 of the cylindrical space, and a swirling gas-liquid mixture outlet 5 arranged near the top of the cylindrical space 1.

FIG. 1 (*a*) is a side view, and FIG. 1 (*b*) is a sectional view along the line X-X of FIG. 1 (*a*).

The main unit of the system or at least the swirling gas-liquid mixture outlet 5 is installed in the liquid. By forcibly sending the pressure liquid into the cylindrical space 1 through the pressure liquid introducing hole 2, a swirling flow is generated in the space, and a portion with negative pressure is generated near the axis of the cylindrical pipe.

By this-negative-pressure, the gas is sucked through the gas introducing hole 4. When the gas passes in the vicinity of the axis of the pipe where the pressure is at the lowest, a swirling gas cavity V in shape of fine string is generated.

In the cylindrical space 1, when the swirling liquid gas mixed flow passes from the bottom 3 of the space to the pressure liquid introducing hole 2, the swirling gas cavity V in shape of string is generated. This is reduced in diameter and narrowed down and torn down to generate micro-bubbles. Then, it is sent toward the swirling gas-liquid mixture outlet 5 and is discharged while swirling.

In association with the swirling, due to the difference of specific gravity between the liquid and the gas, centrifugal force is applied on the liquid and centripetal force is applied on the gas at the same time. As a result, the liquid portion and the gas portion become separable from each other. The gas is formed in string-like shape and continues to flow near the pressure liquid introducing hole 2 of the central line of the cylindrical space 1. Then, the swirling is rapidly weakened. Further, it is reinforced by the rotating flow introduced through the pressure liquid introducing hole. Then, when rotating flow in conical shape is formed downstream, the rotating velocity of this portion is rapidly decreased.

Before and after the portion 10 in FIG. 1 (*a*), big difference of rotating velocity is generated. As a result, the gas cavity V in string-like shape is continuously and steadily cut off. Then, micro-bubbles Mb, e.g. micro-bubbles of 10-20 μm in diameter, are generated near the swirling gas-liquid mixture outlet 5, and these are discharged into the liquid outside of the system.

Normally, the system main unit of the present invention or at least the swirling gas-liquid mixture outlet 5 is installed in the liquid.

Figure 2:
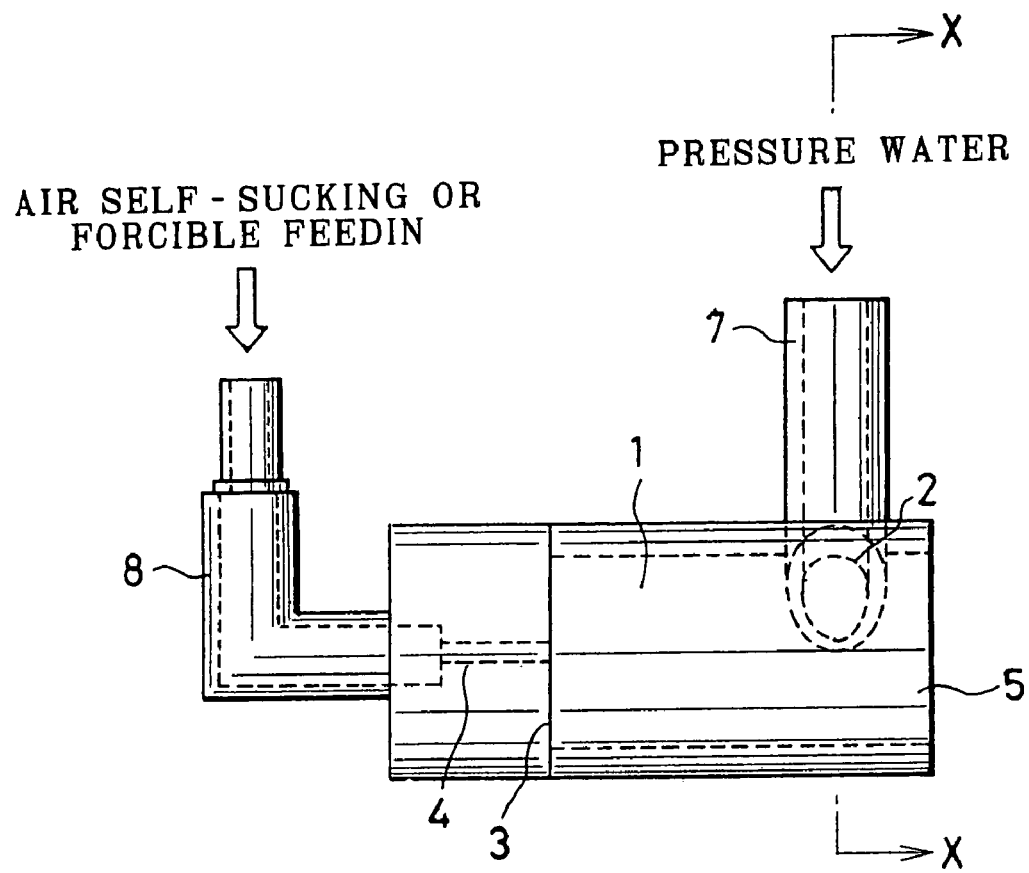
FIG. 2 is a drawing to explain the principle of the present invention and also to explain a system of another embodiment of the present invention.
Figure 2:
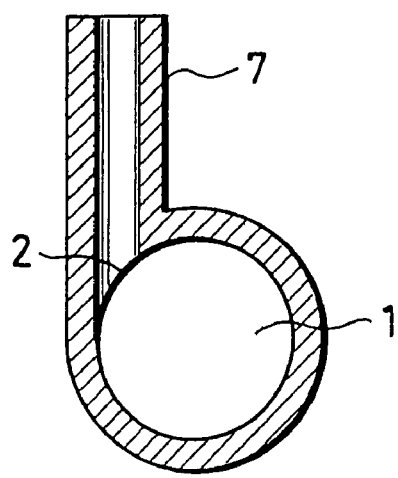

FIG. 2 is a drawing to explain the principle of the present invention, also serving to explain a system of an embodiment. FIG. 2 (*a*) is a side view, and FIG. 2 (*b*) is a sectional view along the line X-X of FIG. 2 (*a*).

A gas introducing pipe 8 for introducing the gas is connected to the forward end of the gas introducing hole 4, and there is provided a pressure liquid inlet pipe 7 for supplying pressure liquid (e.g. pressurized water) to the pressure liquid inlet 2.

Also, a pressure liquid inlet 2 is opened in tangential direction on circumferential surface of inner wall of the cylindrical space 1.

Figure 3:
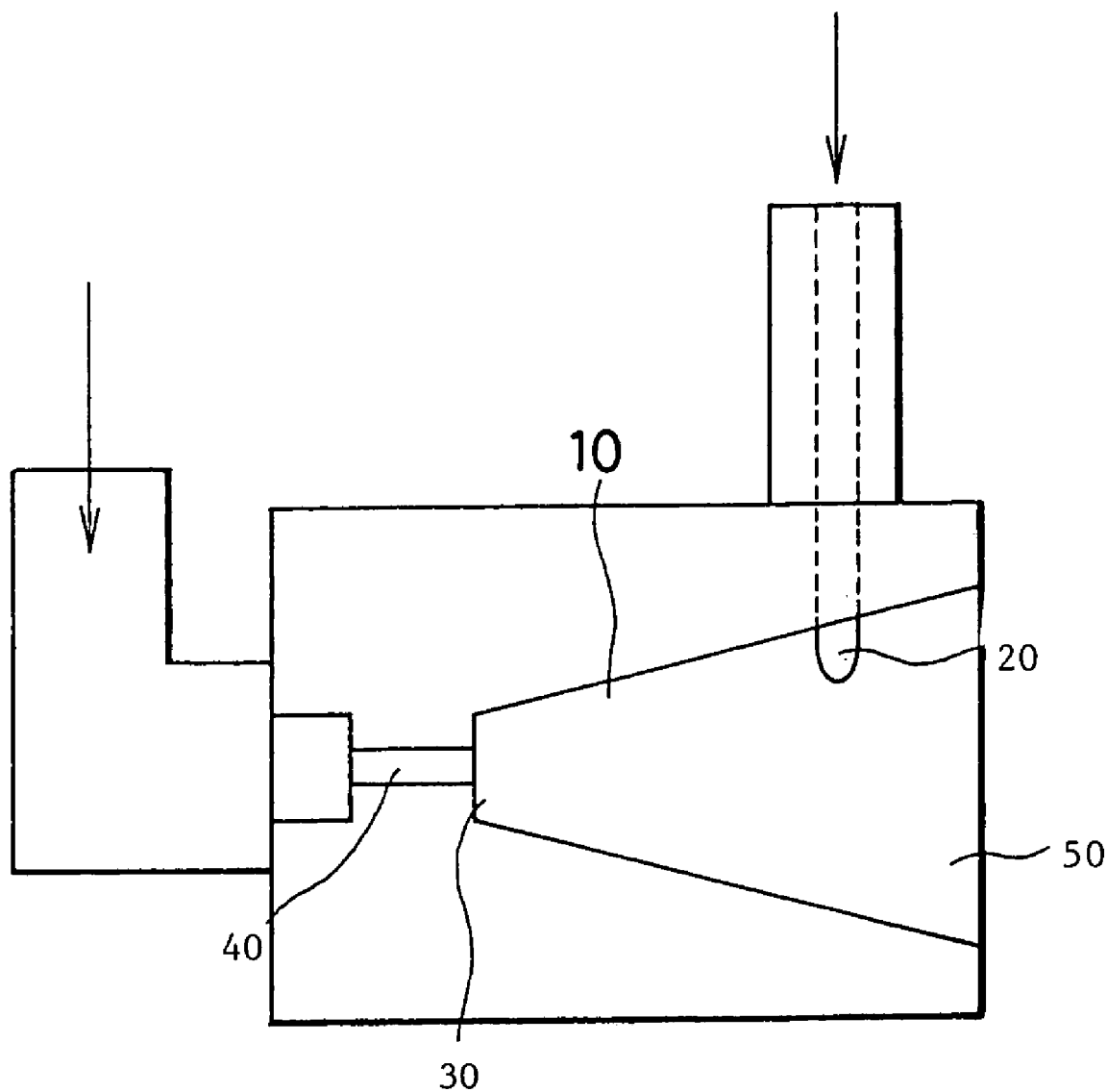
FIG. 3 is a drawing to explain a system of another modified embodiment of the invention.

According to another aspect of the invention, as shown in FIG. 3, a system with a megaphone-like space 10 is proposed.

The system comprises a container main unit having a megaphone-like space 10 with the inlet closed, a pressure liquid inlet 20 opened in tangential direction on a part of circumferential surface of inner wall of the space 10, a gas introducing hole 40 opened on an opening (closed end) 30 of the megaphone-like space, and a swirling gas-liquid mixture outlet 50 opened at the top of the megaphone-shaped space 10.

There are two cases: the case where the main unit of the system is installed under the water surface, the case where it is installed outside and in contact with a water tank, and a case where it is installed on faucet of water works.

According to the present invention, water is normally used as the liquid and the air is used as the gas. In addition, the liquid may include solvent such as toluene, acetone, alcohol, etc., fuel such as petroleum, gasoline, etc., foodstuff such as edible oil, butter, ice cream, beer, etc., drug preparation such as drug-containing beverage, health care product such as bath liquid, environmental water such. as water of lake or marsh, or polluted water from sewage purifier, etc. Further, the gas may include inert gas such as hydrogen, argon, radon, etc., oxidizing agent such as oxygen, ozone, etc., acidic gas such as carbon dioxide, hydrogen chloride, sulfurous acid gas, nitrogen oxide, hydrogen sulfide, etc., and alkaline gas such as ammonia.

From the gas introducing hole 4, the gas is automatically sucked in (self-sucked), and the gas is incorporated into the swirling liquid gas mixed flow as the swirling cavity V of string-like shape.

The gas swirling cavity V of string-like shape at the central portion and the liquid swirling flow around it are injected through the outlet 5. At the same time as this injection, the swirling is rabidly weakened by static liquid in the surrounding because radical difference of swirling, velocity occurs. Then, the gas cavity V in string-like shape at the center of the swirling flow is continuously and steadily cut off. As a result, a large quantity of micro-bubbles, e.g. micro-bubbles of 10-20 μm in diameter, are generated near the outlet 5.

In FIG. 1, the relationship of bore diameter $d_1$ of the swirling gas-liquid mixture outlet 5, bore diameter $d_2$ of the gas introducing hole 4 bore diameter $d_3$ of the pressure liquid introducing pipe, and the distance L between the swirling gas-liquid mixture outlet 5 and the bottom 3 of the cylindrical space can be given as:

$L \approx 0.5 \text{ to } 3.0 \times d_1$

The range of the numerical values due to the difference of the type of system is as follows:

|  | $d_1$ | $d_2$ | $d_3$ | L |
| --- | --- | --- | --- | --- |
| Mini-size system | 0.5 cm or less | 0.3~0.8 mm | 0.5 cm or less | 0.5~1.5 cm |
| Small-size system | 0.5~2.0 cm | 0.5~1.0 mm | 0.5~1.0 cm | 1.0~6.0 cm |
| Medium-size system | 2.0~5.0 cm | 1.0~1.5 mm | 1.0~2.0 cm | 1.0~15 cm |
| Large-size system | 5 cm or more | 1.0~2.0 mm | 2 cm or more | 15 cm or more |

In case of medium-size system, e.g. the pump has a motor of 200-400 W, discharge volume of 40 liters/min., and lift of 15 m. Using this, a large quantity of micro-bubbles can be generated. Over the entire water surface in a water tank with volume of 5 m³, micro-bubbles of about 1 cm in thickness were accumulated during operation. This system could be used for purification of water in a pond with volume of 2000 m³ or more.

In a small-size system, for example, the pump has a motor of 30 W, discharge volume of 20 liters/min. This system could be used in a water tank with volume of 5 liters to 1 m³.

When this system is applied for seawater, micro-bubbles can be very easily generated, and it is possible to further expand the application for use.

Figure 4:
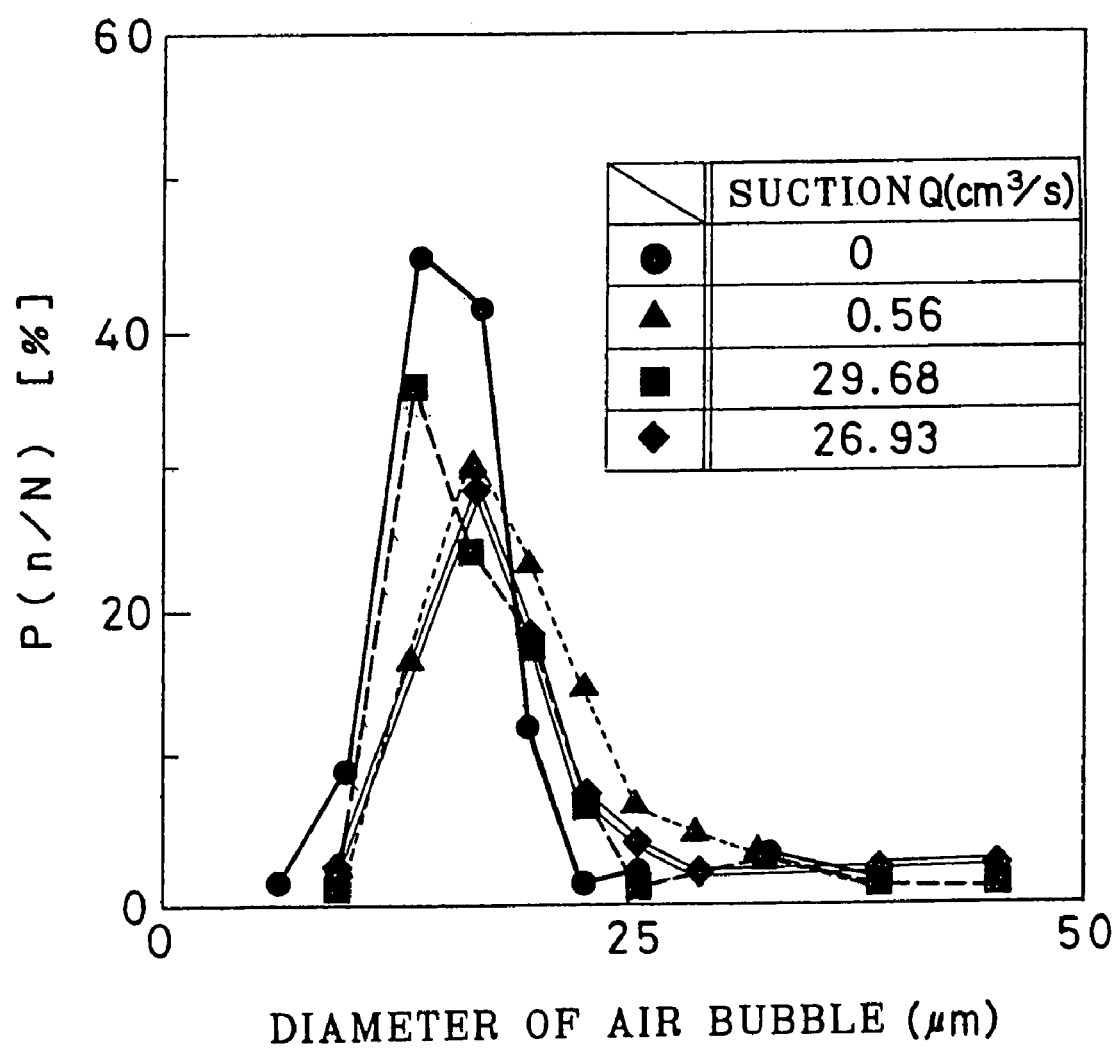
FIG. 4 is a graphic representation showing diameter of air bubbles and distribution of bubble generating frequency when a-medium-size system of the present invention is installed under water and micro-bubbles are generated using the air-as gas.

FIG. 4 is a graphic representation of diameter of bubbles and distribution of bubble generating frequency when a medium-size system of the present invention is installed under water and micro-bubbles are generated using the air as gas. Also, the results are shown for the case where air suction volume from the gas introducing hole 4 is regulated. In this figure, even when air suction is set to 0 cm³/s, bubbles of 10-20 μm in diameter are generated. This may be caused by the fact that the air dissolved in water are separated and bubbles are generated. Therefore, the system of the present invention can also be used as a deaeration system of dissolved gas.

As described above, when the system of the present invention is installed in the liquid, and pressure liquid (e.g. pressurized water) is supplied into the cylindrical space 1 from the pressure liquid inlet 2 via the pressure liquid inlet pipe 7 using a pump, and the gas introducing pipe 8 (e.g. air supply pipe), is connected to the gas introducing hole 4. Under this condition, micro-bubbles of 10-25 μm in diameter can be easily generated and supplied into the liquid (e.g. water).

The space as described above may not necessarily be in cylindrical shape. For example, a space with diameter gradually. increased in one direction, e.g. a space of a megaphone-like shape as shown in FIG. 3 may be used.

The generation of bubbles can be controlled by regulation of a gas flowrate regulating valve connected to the forward end of the gas introducing pipe 8, and optimal generation of micro-bubbles can be easily controlled. Further, bubbles having diameter of more than 10-20 μm can be easily generated by regulating the valve.

Figure 5:
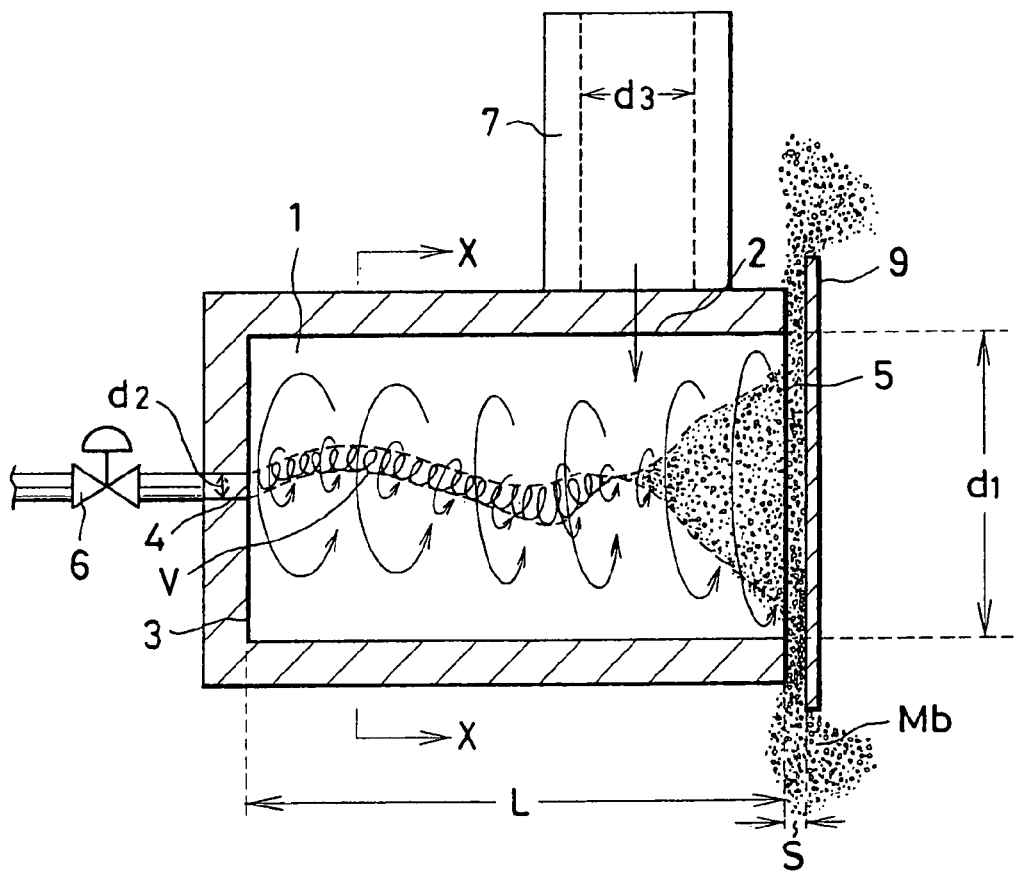
FIG. 5 is a drawing to explain a system of still another modified embodiment of the present invention.
Figure 5:
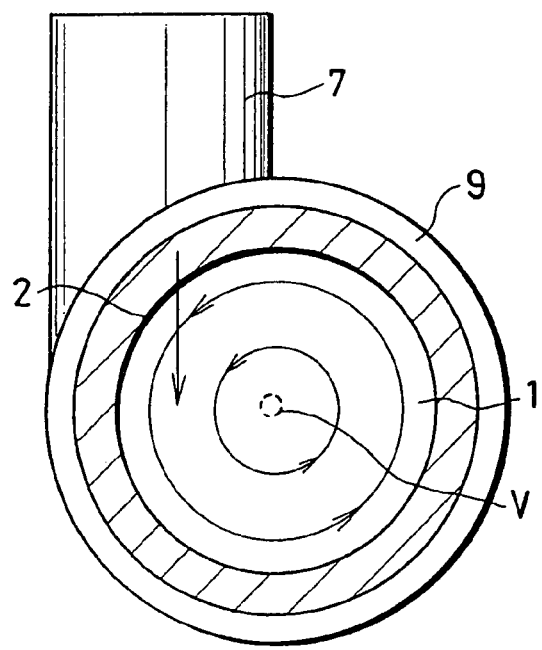

Further, in the present invention, it is preferable that a baffle plate 9 is arranged with a small spacing S immediately before the swirling gas-liquid mixture outlet 5 opened at the top of,the cylindrical space 1 as shown in FIG. 5. In FIG. 5, FIG. 5 (*a*) is a longitudinal sectional view, and FIG. 5 (*b*) is a sectional view along the line X-X. A disk-like baffle plate 9 is disposed with a small spacing S of preferably 0.2 to 1.0 mm immediately before the swirling gas-liquid mixture outlet 5. As a result, micro-bubbles can be discharged out of the system steadily and in large quantity.

When the small spacing S is decreased, micro-bubbles are turned to finer bubbles, but discharge quantity is decreased. In this case, by supplying pressure gas through the gas introducing hole 4, large quantity of bubbles can be discharged.

Figure 6:
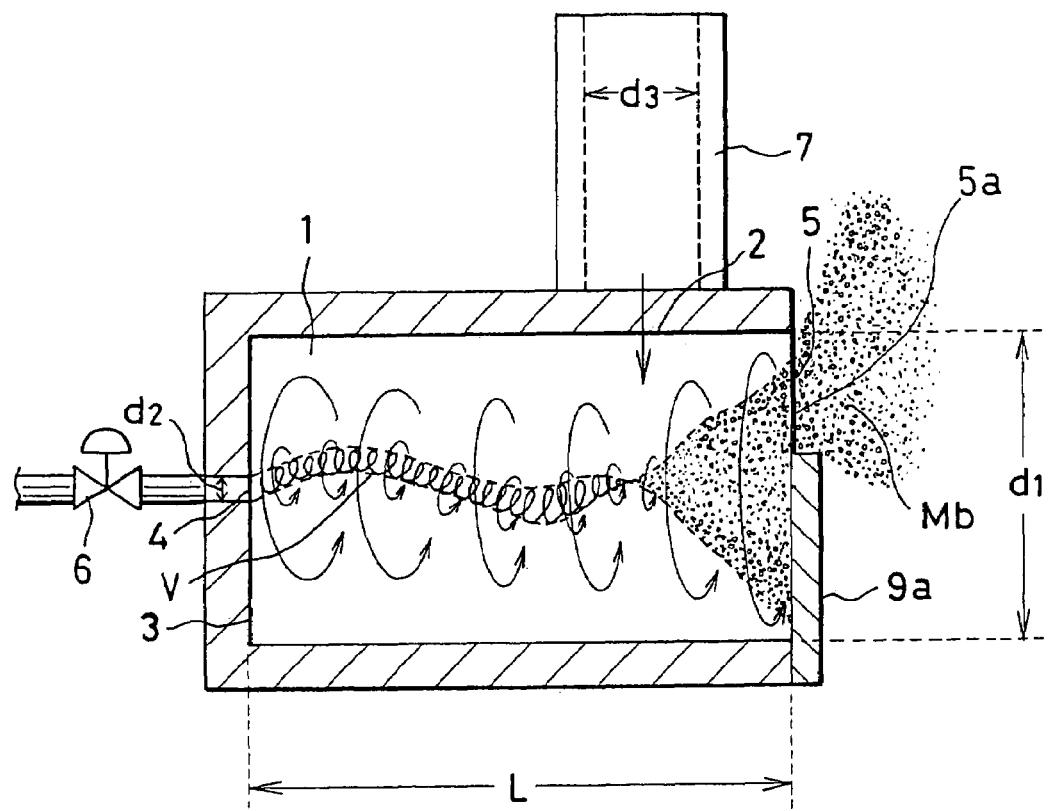
FIG. 6 is a drawing to explain a system of still another modified embodiment of the present invention.
Figure 6:
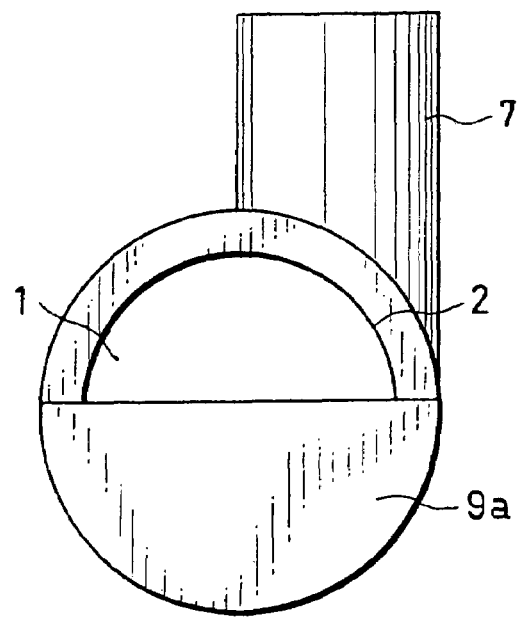

As shown in FIG. 6, it is preferable that a partition plate 9a may be attached immediately before the swirling gas-liquid mixture outlet 5 opened at the top of the cylindrical space 1, and the outlet 5 may be closed, leaving only a partial opening 5a. In FIG. 6, FIG. 6 (*a*) is a longitudinal sectional view, and FIG. 6 (*b*) is a side view seen from left. The partition plate 9a is attached under the swirling gas-liquid mixture outlet 5 leaving an opening 5a above the outlet. As a result, micro-bubbles can be discharged out of the system steadily and in large quantity.

In particular, micro-bubbles can be sufficiently generated even when the system shown in FIG. 5 and FIG. 6 is used at a place where high water pressure is applied.

The system of the present invention may be made of the materials such as plastics, metal, glass, etc., and it is preferable that the components of the system are integrated together by bonding, screw connection, etc.

INDUSTRIAL APPLICABILITY

By the swirling type micro-bubble generating system of the present invention, it is possible to readily generate micro-bubbles in industrial scale. Because the system is relatively small in size and has simple construction, it is easier to manufacture, and the system will contribute to purification of water in ponds, lakes, marshes, man-made lakes, rivers, etc., processing of polluted water using microorganisms, and culture of fishes and other aquatic animals.

Micro-bubbles generated by the system according to the present invention can be used in the following applications:
(1) Purification of water quality in man-made lakes, natural lakes, ponds, rivers, sea, etc. and preservation of natural environment through growth of animals and microorganisms.
(2) Purification of man-made and natural waters such as biotope and promotion of growth of fireflies, water weeds, etc.
(3) Industrial Applications
  Diffusion of high temperature in steel manufacture.
  Promotion of acid cleaning of stainless steel plate and wires.
  Removal of organic substances in ultra-pure water manufacturing factory.
  Removal of organic substances in polluted water by micro-bubble formation of ozone, increase of dissolved oxygen, sterilization, manufacture of synthetic resin foam such as urethane foam product.
  Processing of various types of waste water and liquid.
  Sterilization by ethylene oxide, promotion of mixing of ethylene oxide with water in sterilizer.
  Emulsification of defoaming-agent.
  Aeration of polluted water in activated sludge treatment method.
(4) Agricultural Applications
  Increase of oxygen and dissolved oxygen to be used in hydroponic culture, and improvement of production yield.
(5) Fisheries
  Culture of eel
  Maintenance of life in cuttlefish tank
  Culture of yellowtail
  Artificial development of seeweeds
  Promotion of growth of fishes
  Prevention of red tide
(6) Medical Applications
  Use of micro-bubbles in hot bath to promote blood circulation and to maintain hot water in bath

What is claimed is:
1. A swirling type micro-bubble generating system, comprising a container main unit having a cylindrical space with bottom, a pressure liquid inlet opened in tangential direction on a part of circumferential surface of inner wall of said space, a gas introducing hole opened at the bottom of the cylindrical space, and a swirling gas-liquid mixture outlet opened at the top of said cylindrical space, wherein a baffle plate is arranged immediately before the swirling gas-liquid mixture outlet opened at the top of the cylindrical space.

* * * * *